United States Patent Office 3,751,563
Patented Aug. 7, 1973

3,751,563
SUNSCREENS PREPARATIONS
Earl L. Richardson, Congers, N.Y., assignor to Union
  Carbide Corporation, New York, N.Y.
No Drawing. Filed June 11, 1969, Ser. No. 832,480
Int. Cl. A61l 23/00
U.S. Cl. 424—60                                        5 Claims

ABSTRACT OF THE DISCLOSURE

A solution adapted for use as a cosmetic sun-screen preparation comprising a polypropylene glycol monoalkylether fluid having an average molecular weight of about 400 to about 3000 and a viscosity of about 120 to about 3000 as measured in Saybolt Universal Seconds at 100° F. and wherein the alkyl group has from 1 to 10 carbon atoms as solvent and a chemical sunscreen agent as solute in at least a sufficient amount to screen the sun from human skin and up to about nine percent by weight of the solvent, said chemical sunscreen agent being selected from the group consisting of 2-ethoxyethyl p-methoxycinnamate, amyl p-dimethylaminobenzoate, homomenthyl salicylate, 2-hydroxy - 4 - methoxy-benzophenone, 2,4-dihydroxy-benzophenone, 1 - monoglyceryl p-aminobenzoate, 2-ethylhexyl salicylate, and phenyl salicylate.

---

This invention relates to a sunscreen preparation characterized by insolubility in water and substantial freedom from an oily feel in actual use.

The present commercially available sunscreen formulations fall into two distinct categories. One common type employs a chemical sunscreen in a mineral oil base. While this product possesses the property of being not readily washable off the skin when in contact with water, it has droxy-benzophenone, 1 - monoglyceryl p-aminobenzoate, 2-ethylhexyl salicylate, and phenyl salicylate.
the distinct disadvantage of having both an initial and continuing oily feel after application which makes it unpopular with many sunbathers and swimmers.

The attempt to produce a less unctuous product led to the second type of preparation which has found a certain degree of commercial success, this being an oil-in-water emulsion, generally in cream or lotion form. While this preparation does overcome the problem of oiliness, it washes off very easily when the swimmer enters the water, severely reducing his protection from the burning rays of the sun. In addition, these creams and lotions also tend to have a sticky feel.

It is therefore an object of this invention to produce an acceptable sunscreen preparation which does not have an oily feel when applied to the skin.

It is another object of this invention to formulate a sunscreen preparation which does not wash off when the swimmer enters the water.

It is another object of this invention to formulate a cosmetically acceptable sunscreen preparation which does not have an oily feel on the skin and which does not wash off when the swimmer enters the water.

These and other objects will become obvious by the following description of the invention.

It has now been found that a sunscreen product having a non-oily feel after application to the skin and little or no tendency to wash off in water can be produced when monoalkylethers of low and medium viscosity polypropylene glycols are used as the major constituent in a non-emulsified sunscreen preparation. Ethyl alcohol or isopropyl alcohol, which are insoluble in a mineral oil base, can also be readily added to this preparation for both the commonly used chemical sunscreens and the monoalkylether polypropylene glycol fluids are readily soluble therein. If a degree of oiliness is desired, advantage can be taken of the coupling properties of the polyalkylene glycols in that small amounts of mineral oil can also be added without forming a haze or separate layers.

Any conventional chemical sunscreen can be used in the novel preparations of the invention. The term chemical sunscreen is meant to encompass any organic chemical compound which is capable of absorbing sunlight over the ultra-violet range which causes burning and redness, yet will allow the desirable tanning rays of the sun through to the skin. Typical chemical sunscreens which are useful in the formulations of the invention are 2-ethoxyethyl p-methoxycinnamate, amyl p-dimethylaminobenzoate, homomenthyl salicylate, 2-hydroxy-4-methoxy-benzophenone, phenyl salicylate, 2-ethylhexyl salicylate, 2,4-dihydroxybenzophenone, 1 - monoglyceryl p-aminobenzoate, and the like. The first six recited additives are soluble in monoalkylether polypropylene glycol fluids in excess of 9 percent by weight which is approximately equal to or greater than the maximum strength of sunscreen additives in commercially available products. A mixture of a monoalkylether polypropylene glycol fluid and ethyl alcohol or isopropyl alcohol should be used for the last two recited chemical sunscreens to insure sufficient solubility for an effective product. Dipropylene glycol salicylate and digalloyl trioleate also are chemical sunscreens useful in the instant formulations.

The monoalkylether polypropylene glycol fluid which are useful in the practice of this invention are those with an average molecular weight of from about 400, and lower, up to a molecular weight wherein the fluid begins to be too thick for easy application. A practical upper molecular weight limit is about 3,000, and higher. The viscosity range of such fluids is from about 120, and lower, to about 3,000, and higher, Saybolt Universal Seconds (SUS) determined at 100° F. by standard ASTM methods. The monoalkylether polypropylene glycol fluids of the novel sunscreen formulations are described with particularity in U.S. Pat. No. 2,448,664, issued Sept. 7, 1948. See especially columns one through four thereof and said patent is hereby incorporated by reference. Preferred monoalkylethers of polypropylene glycol fluids are those wherein the alkyl group contains 1 to 10 carbon atoms. The monobutylether of polypropylene glycol fluids is particularly preferred. Polypropylene glycol fluids per se can also be used in the novel formulations provided they have the necessary aforementioned viscosity characteristics.

The polypropylene glycol monoalkylether fluids can be diluted with ethyl alcohol or isopropyl alcohol to improve ease of application up to about 60 percent by weight, and higher, based upon the weight of the total composition. The preferred amount of alcoholic diluent is up to about 30 percent by weight, based upon the weight of the total composition. Dilution of the chemical sunscreen-polypropylene glycol monoalkylether mixture with ethyl alcohol or isopropyl alcohol should be kept to the minimum required for good application properties because after the alcohol evaporates, a thinner residual film will be left upon the skin than if no alcohol at all were used. This thinner film is also more prone to wash off the skin than a product containing no alcohol at all.

If desired, mineral oil is present in the novel sunscreen preparation in amounts up to 10 parts by weight, based upon the total weight of the sunscreen preparation. If mineral oil is added, a range of from about 3 parts to about 7 parts by weight is preferred. Ordinarily, the sunscreen preparation will contain no mineral oil because it tends to give the preparation an oily feel after application to the skin.

It does not appear to be critical how the components are mixed. The chemical sunscreens can be easily incorporated into the polypropylene glycol monoalkylether fluids by stirring or mixing until uniform in conventional equipment such as blenders, glasslined or stainless-steel kettles, and the like.

The following examples are illustrative of the invention.

EXAMPLE 1

In this example, the solubility of various chemical sunscreens was investigated in a typical polypropylene glycol monoalkylether fluid. In each case 20 grams of a polypropylene glycol monobutylether fluid having an average molecular weight of 2480 and a viscosity range of 1630–1800 SUS at 100° F. was placed in a small beaker and various chemical sunscreens were added in increments of a few tenths of a gram while stirring at room temperature with a glass rod was taking place. Under such conditions, two grams of 2-ethoxyethyl p-methoxycinnamate, amyl p-dimethylaminobenzoate, homomenthyl salicylate, and 2-hydroxy-4-methoxy-benzophenone were all readily dissolved in the solution. 2,4-dihydroxy-benzophenone was only soluble to about 4.7 percent and 1-monoglyceryl p-aminobenzoate was soluble to less than one-half percent. The solubility of the latter two chemical sunscreens can be increased to an acceptively protective level by using a solution of polypropylene glycol monobutylether fluid and ethyl alcohol.

EXAMPLES 2-4

In these examples, a solvent mixture for investigation purposes was formulated comprising:

|  | Percent by weight |
|---|---|
| Polypropylene glycol monobutylether fluid having an average molecular weight of 2050 and a viscosity range of 1085–1205 SUS at 100° F. | 40 |
| Ethyl alcohol, anhydrous | 53 |
| Mineral oil | 7 |
|  | 100 |

Three 200 gram solutions were made having the following compositions (all parts by weight):

| Example | 2 | 3 | 4 |
|---|---|---|---|
| Above solvent mixture | 90 | 98 | 98 |
| Homomenthyl salicylate | 10 |  |  |
| Amyl p-dimethylaminobenzoate |  | 2 |  |
| 2-ethoxyethyl p-methoxycinnamate |  |  | 2 |
|  | 100 | 100 | 100 |

Each of the preparations had been made by adding the chemical sunscreen at room temperature and stirring with a glass rod.

None of the solutions were found to have any deleterious effects upon human skin.

EXAMPLES 5-6

In these examples, a polypropylene glycol monobutylether fluid having an average molecular weight of 1578 and a viscosity range of 595–655 SUS at 100° F. was added to sunscreen formulations containing 2-ethylhexyl salicylate and phenyl salicylate in amounts set forth below, with parts by weight.

| Example | 5 | 6 |
|---|---|---|
| Above polypropylene glycol monbutyl ether fluid | 55 | 69 |
| 2-ethylhexyl salicylate | 5 |  |
| Phenyl salicylate |  | 6 |
| Ethyl alcohol, denatured | 40 | 25 |
|  | 100 | 100 |

Tests of these sunscreen preparations also showed that there were no deleterious effects upon human skin.

Various additives can be incorporated into the novel sunscreen preparation with no adverse effects. Dihydroxyacetone can be added to permit the wearer to have a year round suntan, due to the ability of dihydroxyacetone to brown or "tan" the keratinized cells in the stratum corneum of the skin. If desired, insect repellent compounds, such as 2-ethyl-1,3-hexanediol, can be incorporated for a combination sunscreen-insect repellant product. Perfume oils can also be added to give the final product a pleasant odor, and a coloring material or dye can be added to give a pleasant appearance.

What is claimed is:

1. A solution adapted for use as a cosmetic sunscreen preparation comprising a polypropylene glycol monoalkylether fluid having an average molecular weight of about 400 to about 3000 and a viscosity of about 120 to about 3000 as measured in Saybolt Universal Seconds at 100° F. and wherein the alkyl group has from 1 to 10 carbon atoms as solvent and a chemical sunscreen agent as solute in at least a sufficient amount to screen the sun from human skin and up to about nine percent by weight of the solvent, said chemical sunscreen agent being selected from the group consisting of 2-ethoxyethyl p-methoxycinnamate, amyl p-dimethylaminobenzoate, homomenthyl salicylate, 2-hydroxy-4-methoxy-benzophenone, 2,4-dihydroxy-benzophenone, 1-monoglyceryl p-aminobenzoate, 2-ethylhexyl salicylate, and phenyl salicylate.

2. The solution of claim 1 further comprising up to 60 percent by weight, based on the weight of the total composition, of an alcohol selected from the group consisting of ethyl alcohol and isopropyl alcohol.

3. The solution of claim 2 further comprising mineral oil in an amount small enough to avoid the formation of separate layers.

4. The solution of claim 1 wherein said polypropylene glycol monoalkylether fluid is a polypropylene glycol monobutylether fluid.

5. The solution of claim 2 wherein said polypropylene glycol monoalkylether fluid is a polypropylene glycol monobutylether fluid.

References Cited

UNITED STATES PATENTS

| 2,448,664 | 9/1948 | Fife et al. | 260—615 |
| 3,190,926 | 6/1965 | Edwards | 252—52 A UX |

FOREIGN PATENTS

| 601,419 | 5/1948 | Great Britain | 252—52 A |

OTHER REFERENCES

De Navarre, International Encyclopedia of Cosmetic Materials Trade Names, 1957, pp. 303, 304, 316, 317 and 324.

Sagarin, Cosmetics Science and Technology, 1957, pp. 197–209.

SAM ROSEN, Primary Examiner

U.S. Cl. X.R.

424—59